United States Patent
Huang et al.

(10) Patent No.: US 12,463,784 B2
(45) Date of Patent: Nov. 4, 2025

(54) DYNAMIC QUANTIZATION OF CHANNEL QUALITY INFORMATION

(71) Applicant: QUALCOMM Incorporated, San Diego, CA (US)

(72) Inventors: Yi Huang, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/821,125

(22) Filed: Aug. 19, 2022

(65) Prior Publication Data

US 2023/0054077 A1 Feb. 23, 2023

Related U.S. Application Data

(60) Provisional application No. 63/260,486, filed on Aug. 20, 2021.

(51) Int. Cl.
*H04L 5/00* (2006.01)

(52) U.S. Cl.
CPC .......... *H04L 5/0057* (2013.01); *H04L 5/0094* (2013.01)

(58) Field of Classification Search
CPC ... H04L 5/0094; H04L 5/0053; H04L 5/0057; H04L 5/0007
See application file for complete search history.

(56) References Cited

U.S. PATENT DOCUMENTS

| 11,251,921 | B2 * | 2/2022 | Kwak | H04W 72/0453 |
| 2019/0052397 | A1 * | 2/2019 | Onggosanusi | H04L 1/0016 |
| 2020/0007246 | A1 * | 1/2020 | Chang | H04W 72/21 |
| 2020/0389279 | A1 | 12/2020 | Chen et al. | |

FOREIGN PATENT DOCUMENTS

| WO | WO-2009059039 A2 | 5/2009 |
| WO | WO-2021030041 A1 | 2/2021 |

OTHER PUBLICATIONS

Interdigital Inc: "CSI Feedback Enhancements", 3GPP TSG RAN WG1 #106-e, R1-2108237, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 13, 2021, XP052041734, 12 Pages, Sections 2, 3.
Partial International Search Report—PCT/US2022/075245—ISA/EPO—Dec. 7, 2022.

(Continued)

*Primary Examiner* — Peter Chen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a signal associated with a communication channel. The UE may transmit a channel quality indicator (CQI) report comprising one or more CQI values based at least in part on a determined number of bits used to represent the one or more CQI values. The number of bits used to represent the one or more CQI values is based at least in part on a number of the one or more subbands. Numerous other aspects are described.

30 Claims, 8 Drawing Sheets

(56) References Cited

OTHER PUBLICATIONS

Qualcomm Incorporated: "CSI Enhancement for IOT and URLLC", 3GPP TSG RAN WG1 #106-e, R1-2107337, 3rd Generation Partnership Project, Mobile Competence Centre, 650, Route Des Lucioles, F-06921, Sophia-Antipolis Cedex, France, vol. RAN WG1, No. e-Meeting, Aug. 16, 2021-Aug. 27, 2021, Aug. 7, 2021, XP052038289, 10 Pages, Sections 2, 4.
International Search Report and Written Opinion—PCT/US2022/075245—ISA/EPO—Mar. 2, 2023.

* cited by examiner

DYNAMIC QUANTIZATION OF CHANNEL QUALITY INFORMATION

CROSS-REFERENCE TO RELATED APPLICATION

This Patent Application claims priority to U.S. Provisional Patent Application No. 63/260,486, filed on Aug. 20, 2021, entitled "DYNAMIC QUANTIZATION OF CHANNEL QUALITY INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dynamic quantization of channel quality information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a control message that includes a quantization indication that indicates a number of bits used to represent one or more channel quality indicator (CQI) values corresponding to one or more subband to be reported in a CQI report. The number of bits used to represent each of the one or more CQI values is based at least in part on a number of the one or more subbands to be reported in the CQI report. The method may include receiving a signal associated with a communication channel. The method may include transmitting the CQI report comprising the one or more CQI values based at least in part on the quantization indication.

Some aspects described herein relate to a method of wireless communication performed by a UE. The method may include receiving a signal associated with a communication channel. The method may include determining a number of bits used to represent one or more CQI values corresponding to one or more subbands to be reported in a CQI report. The number of bits used to represent each of the one or more CQI values is based at least in part on a number of the one or more subbands to be reported in the CQI report. The method may include transmitting the CQI report based at least in part on the determine number of bits.

Some aspects described herein relate to a UE for wireless communication. The UE may include a memory and one or more processors coupled to the memory. The one or more processors may be configured to receive a control message that includes a quantization indication that indicates a number of bits used to represent one or more CQI values corresponding to one or more subbands to be reported in a CQI report. The number of bits used to represent each of the one or more CQI values is based at least in part on a number of the one or more subbands to be reported in the CQI report. The one or more processors may be configured to receive a signal associated with a communication channel. The one or more processors may be configured to transmit the CQI report based at least in part on the quantization indication.

Some aspects described herein relate to a UE for wireless communication. The UE may include a memory and one or more processors coupled to the memory. The one or more processors may be configured to receive a signal associated with a communication channel. The one or more processors may be configured to determine a number of bits used to represent one or more CQI values, corresponding to one or more subbands to be reported in a CQI report. The one or more processors may be configured to transmit the CQI report comprising the one or more CQI values based at least in part on the determined number of bits.

Some aspects described herein relate to a non-transitory computer-readable medium that stores a set of instructions for wireless communication by a UE. The set of instructions, when executed by one or more processors of the UE, may cause the UE to receive a control message that includes a quantization indication that indicates a number of bits used to represent one or more CQI values corresponding to one or more subbands to be reported in a CQI report. The number of bits used to represent each of the one or more CQI values is based at least in part on a number of the one or more subbands to be reported in the CQI report. The set of instructions, when executed by one or more processors of the UE, may cause the UE to receive a signal associated with a communication channel. The set of instructions, when executed by one or more processors of the UE, may cause the UE to transmit the CQI report based at least in part on the quantization indication.

Some aspects described herein relate to a non-transitory computer-readable medium that stores a set of instructions for wireless communication by a UE. The set of instructions, when executed by one or more processors of the UE, may cause the UE to receive a signal associated with a communication channel. The set of instructions, when executed by one or more processors of the UE, may cause the UE to determine a number of bits used to represent one or more CQI values corresponding to one or more subbands to be reported in a CQI report. The number of bits used to represent each of the one or more CQI values is based at least in part on a number of the one or more subbands to be reported in the CQI report. The set of instructions, when executed by one or more processors of the UE, may cause the UE to transmit the CQI report based at least in part on the determined number of bits.

Some aspects described herein relate to an apparatus for wireless communication. The apparatus may include means for receiving a control message that includes a quantization indication that indicates a number of bits used to represent one or more CQI values corresponding to one or more subbands to be reported in a CQI report. The number of bits used to represent each of the one or more CQI values is based at least in part on a number of the one or more subbands to be reported in the CQI report. The apparatus may include means for receiving a signal associated with a communication channel. The apparatus may include means for transmitting the CQI report based at least in part on the quantization indication.

Some aspects described herein relate to an apparatus for wireless communication. The apparatus may include means for receiving a signal associated with a communication channel. The apparatus may include means for determining a number of bits used to represent one or more CQI values corresponding to one or more subbands to be reported in a CQI report. The number of bits used to represent each of the one or more CQI values is based at least in part on a number of the one or more subbands to be reported in the CQI report. The apparatus may include means for transmitting the CQI report based at least in part on the determined number of bits.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
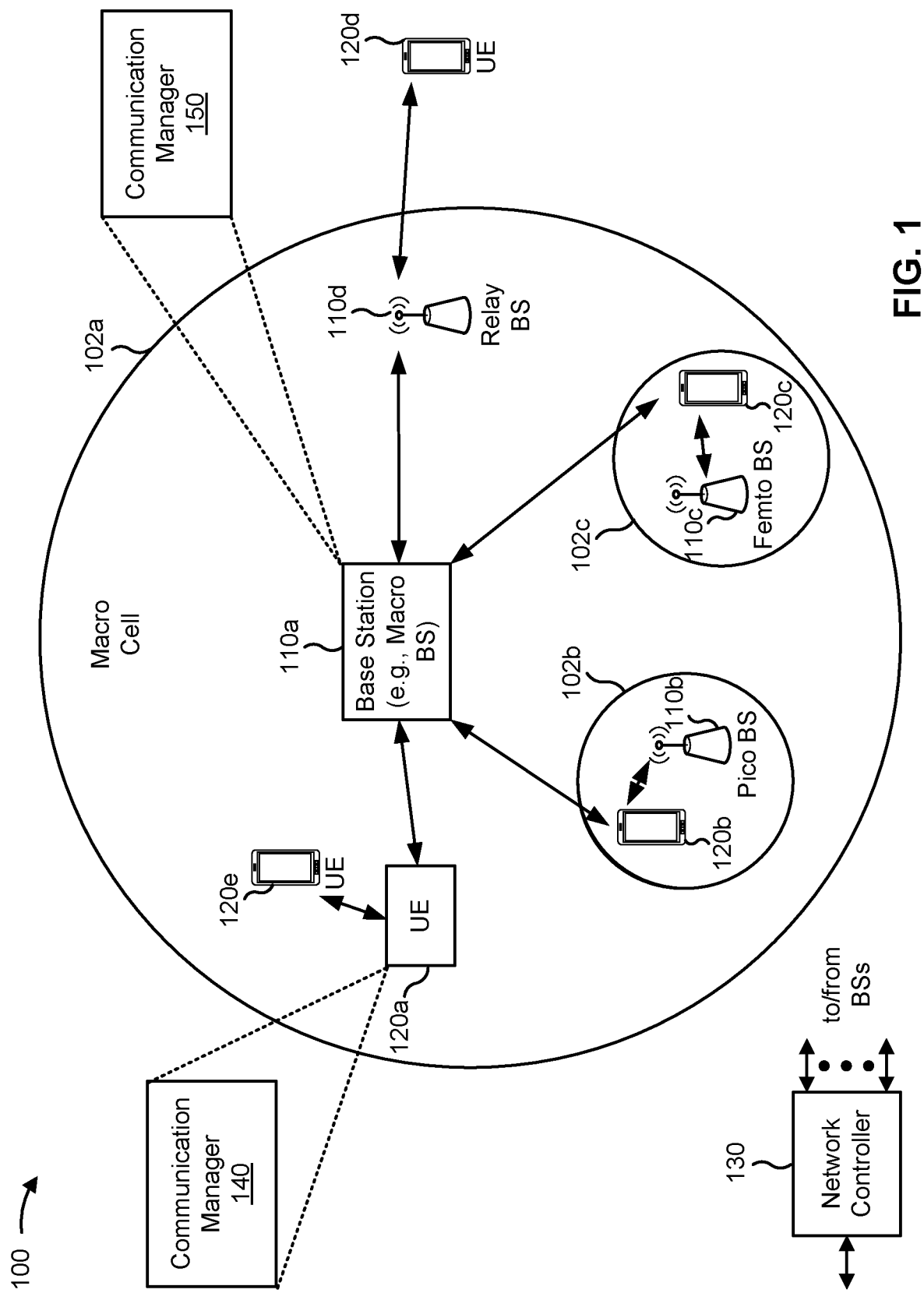
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A network node 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as a "node" or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, the UE 120 may include a communication manager 140. As described in more detail elsewhere herein, the communication manager 140 may receive a signal associated with a communication channel; and transmit a channel quality indicator (CQI) report comprising one or more CQI values corresponding to one or more subbands, wherein a number of bits used to represent each of the one or more CQI values is based at least in part on a number of the one or more subbands to be reported in the CQI report. Additionally, or alternatively, the communication manager 140 may perform one or more other operations described herein.

In some aspects, the network node 110 may include a communication manager 150. As described in more detail elsewhere herein, the communication manager 150 may transmit a signal associated with a communication channel; and receive a CQI report comprising one or more CQI values corresponding to one or more subbands, wherein a number of bits used to represent the one or more CQI values is based at least in part on a number of the one or more subbands to be reported in the CQI report. Additionally, or alternatively, the communication manager 150 may perform one or more other operations described herein.

As indicated above, FIG. 1 is provided as an example. Other examples may differ from what is described with regard to FIG. 1.

Figure 2:
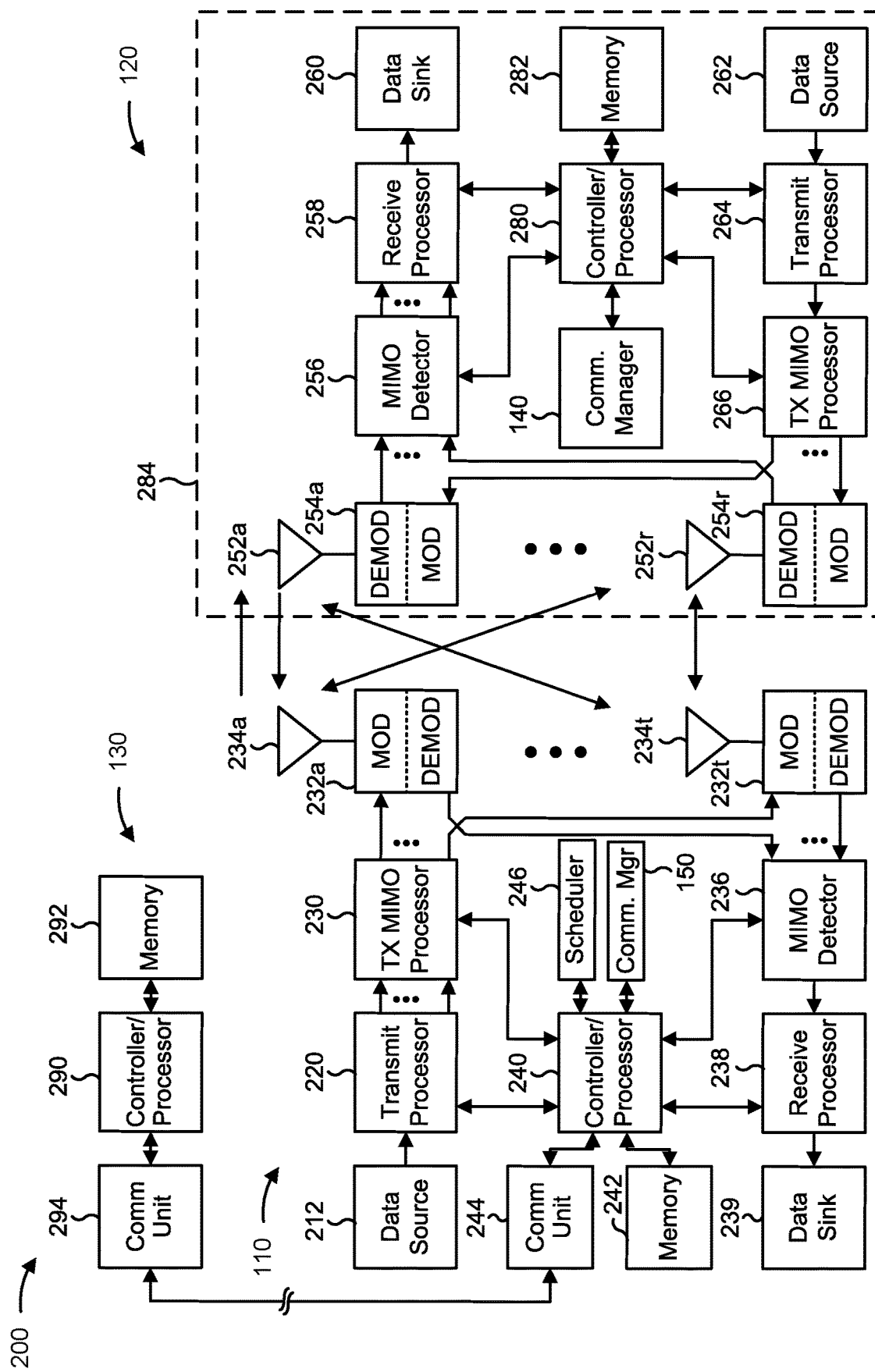
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) Random Access Network (RAN) Intelligent Controller (MC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with dynamic quantization of channel quality information, as described in more detail elsewhere herein. In some aspects, the network node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving a signal associated with a communication channel (e.g., using antenna 252, modem 254, MIMO detector 256, receive processor 258, controller/processor 280, memory 282, or the like); and/or means for transmitting a CQI report comprising one or more CQI values corresponding to one or more subbands, wherein a number of bits used to represent the one or more CQI values is based at least in part on a number of the one or more subbands to be reported in the CQI report (e.g., using controller/processor 280, transmit processor 264, TX MIMO processor 266, modem 254, antenna 252, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node includes means for transmitting a signal associated with a communication channel (e.g., using controller/processor 240, transmit processor 220, TX MIMO processor 230, modem 232, antenna 234, memory 242, or the like); and/or means for receiving a CQI report comprising one or more CQI values corresponding to one or more subbands, wherein a number of bits used to represent the one or more CQI values is based at least in part on a number of the one or more subbands to be reported in the CQI report (e.g., using antenna 234, modem 232, MIMO detector 236, receive processor 238, controller/processor 240, memory 242, or the like). The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
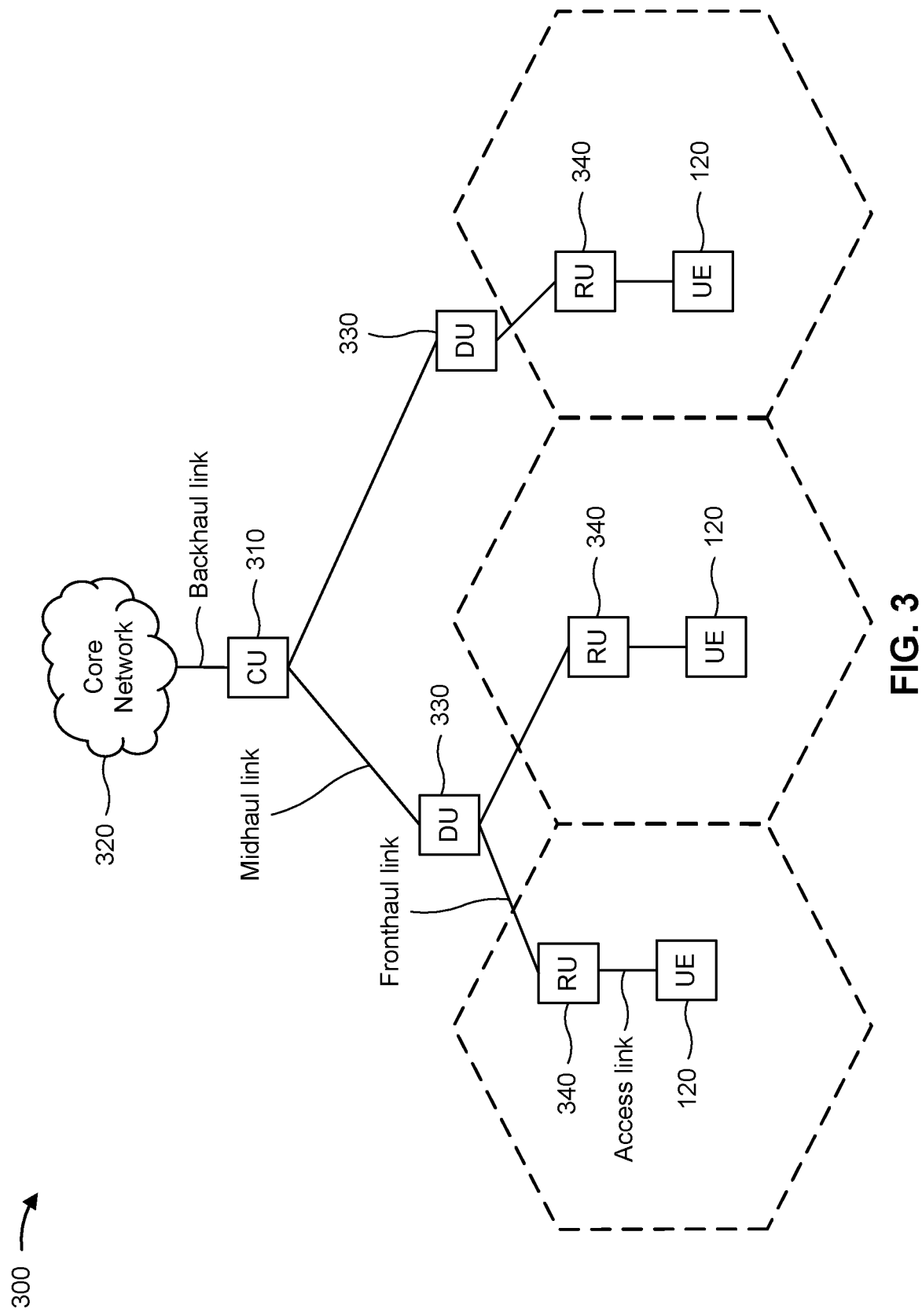
FIG. 3 is a diagram illustrating an example of open radio access network communications, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

A UE can provide information about the quality of a communication channel to a network node by measuring quality metrics associated with a signal from the network node (e.g., a reference signal) and reporting information about those measured metrics using a CQI report. To determine a CQI index or value, the UE may measure signal-to-noise ratio (SNR), signal-to-interference-plus-noise ratio (SINR), and/or other measures of signal or channel quality. Complicated information associated with such SNR, SINR, etc., measured values is then represented as a CQI index. In one example, a CQI index may range from 0 to 15 and may be represented by four (4) bits. The CQI index can then be used, for example, to determine modulation order and code rate using a table, for example, a table that may be specified by a wireless communication standard. When a UE is reporting a single CQI for a plurality of bands or subbands, such a CQI index may be referred to as a wideband CQI or a wideband CQI index. In one example, a wideband CQI can be computed by averaging the CQI indices for the plurality of bands or subbands.

In some implementations, the CQI report may report CQI associated with a plurality of bands and/or a subbands rather than report a single wideband CQI for the plurality of bands and/or subbands. However, in implementations that include a large number, N, of bands/subbands, the total number of bits used for CQI feedback would then be 4N, which may impose significant overhead on a communication network. One scheme to reduce the number of bits used in the case of subband reporting is to report a wideband CQI index and then, for each subband, to report a difference (e.g., offset) between the subband CQI index and the wideband CQI index. This may be referred to herein as differential CQI reporting. Where the wideband CQI index ranges from 0 to 15, the offset between the CQI index for each subband and the wideband CQI index would then range from −15 to 15, which would use five (5) bits to report. As such, in order to reduce the number of bits used for band or subband CQI reporting, the offset (i.e., the offset to be applied to the wideband CQI index to determine the given subband CQI index) can be quantized. In one example, the offset can be quantized into four offsets or offset ranges which can then correspond to or be represented as a two bit differential CQI value via a quantization table that may be specified by a wireless communication standard. It is understood that, as used herein, quantization is a process of mapping an actual value that can have a large number of different values to one of a smaller number of values, where the difference between the actual value and the one of the smaller number of values is referred to as the quantization error. In the context of differential CQI reporting, quantization means representing the offset (which can range from −15 to 15, i.e., 31 different values) with only a few different values (e.g., differential CQI values). Table 1, below, is an example of a quantization table that may be used to facilitate that quantization. Based on the table below, the 31 possible offsets in the example above are reported using only one of four differential CQI values (which can be represented using two bits). As indicated, the subband CQI offset/difference in the range of [2, 15] is quantized as 2 (and is represented as a CQI value of 2) and the subband CQI offset/difference in the range [−15, −1] is quantized as −1 (and is represented as a CQI value of 3). However, this quantization is very coarse and may not be useful in cases in which a difference between the wideband CQI index and the band or subband CQI index is large and where the course quantization may mask differences that are relevant to modulation order determination, code rate determination, resource allocation, and/or channel selection or other wireless communication actions.

TABLE 1

| Sub-band differential CQI value | Offset level |
|---|---|
| 0 | 0 |
| 1 | 1 |
| 2 | ≥2 |
| 3 | ≤−1 |

In some cases, it may be advantageous to increase the two-bit subband differential CQI value to three-bit differential CQI value (or more than three-bit differential CQI value) to offer more accurate CQI feedback (e.g., for ultra-reliable low latency communication (URLLC) services). It is understood that while a two-bit subband differential CQI value can take on 4 different values (and hence the CQI offset is quantized into four different quantizations), a three-bit subband differential CQI value can take on 8 different values (and hence the CQI offset can be quantized into eight different quantizations) However, in many cases, the number of bits to be used for CQI offset feedback (i.e., reporting differential CQI value) is fixed by a wireless communication standard, which may have a negative impact on network communications (e.g., by constraining accuracy and efficiency of CQI reporting).

Some aspects may provide for a dynamic determination of the number of bits to use in the reporting of a differential CQI value. Since the number of bits used for reporting the differential CQI value is related to the number of different values that the differential CQI value can be, where one or more of the differential CQI values can correspond to a range of offset values (such that some offset values are quantized), this number of bits may be referred herein as quantization bits. For example, in some aspects, a UE may receive a signal associated with a communication channel and may transmit a CQI report comprising one or more CQI values corresponding to one or more subbands, and a number of bits used to represent the each of the one or more CQI values may be based at least in part on a number of the one or more subbands to be reported in the CQI report. In this way, the UE may dynamically adjust the number of bits used in quantization of CQI, thereby having a positive impact on network communications (e.g., by introducing flexibility and efficiency to CQI reporting).

Some aspects may facilitate using a coarser quantization (e.g., quantization that uses a fewer number of quantization bits) when a larger number of subbands is used. Using fewer quantization bits per subband can reduce the total number of bits used to report CQI when a larger number of subbands is used. Additionally, although it may seem counter-intuitive to reduce the quantization of the CQI report (i.e., reduce the number of bits used to represent the differential CQI value reported in the CQI report) for increased numbers of subbands (e.g., as it may seem that the reduced quantization may degrade network performance), the inventors have discovered that, as the number of subbands increases, the tolerance for quantization error also increases. For example, suppose the CQI values associated with a few subbands are inaccurate due to larger quantization error as a result of fewer quantization bits being used. In such a case, as the number of subbands increases, the overall percentage of subbands with inaccurate CQI values decreases.

In some cases, a scheduling restriction may be implemented at a network node. For example, if a UE reports a lowest differential CQI value for a subband, the restriction may indicate that the subband may not be used to schedule that UE because the network node does not know how low the actual CQI value is for that subband since the values quantized to the lowest differential CQI may include a large range (e.g., [−15, lowest quantized CQI value]). In a fully loaded system, there may be N subbands and the network node may need to use all of the subbands to support N UEs. Due to the scheduling restriction, a scheduling outage can occur in which one or more UEs are unable to be scheduled at all, if all N UEs report a particular subband with a lowest differential CQI value. If a UE reports a lowest differential CQI value with probability P for a subband, the probability that all UEs will report the subband with a lowest CQI is $N*(P^N)$. If the error margin for network node scheduling outage is P0 (such as $10^{-6}$), then $N*(P^N)<=P0$. Thus, a larger N allows larger P and, therefore, with a larger number of subbands, a UE may have a higher probability to report a lowest CQI. Therefore, a higher threshold may be provided to reduce the number of quantization points, which may allow a more course quantization with a fewer number of bits.

Figure 4:
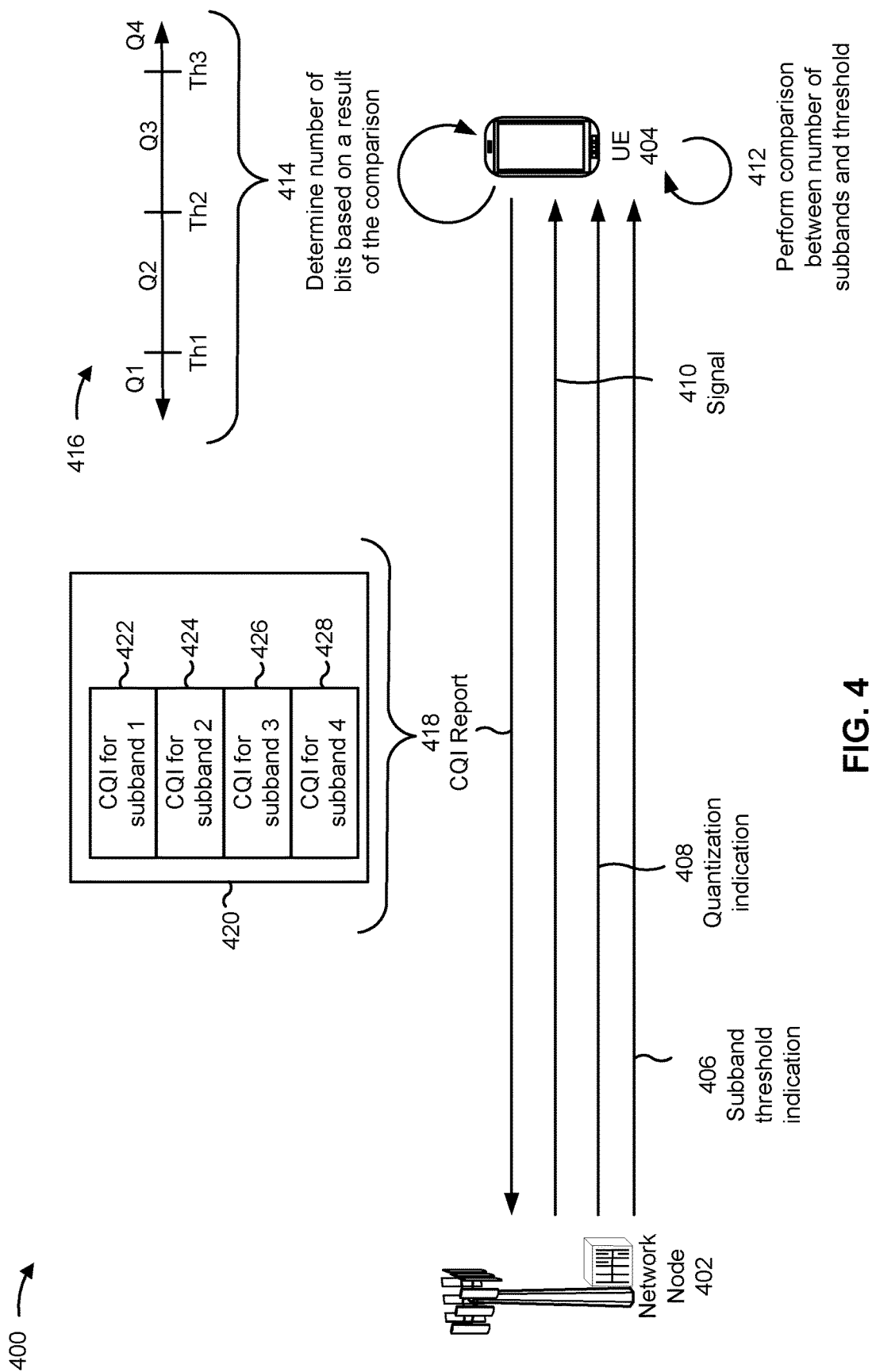
FIG. 4 is a diagram illustrating an example associated with dynamic quantization of channel quality information, in accordance with the present disclosure.

FIG. 4 is a diagram illustrating an example 400 of dynamic quantization of channel quality information, in accordance with the present disclosure. As shown in FIG. 4, a network node 402 and a UE 404 may communicate with one another.

As shown by reference number 406, the network node 402 may transmit, and the UE 404 may receive, a subband threshold indication. The subband threshold indication may indicate at least one subband threshold. In some aspects, the UE 404 may obtain the at least one subband threshold based on receiving the indication. The subband threshold indication may be carried in a radio resource control (RRC) message that includes the indication of the at least one subband threshold. In some aspects, the UE 404 may obtain the at least one subband threshold from a wireless communication standard.

As shown by reference number 408, the network node 402 may transmit, and the UE 404 may receive, a quantization indication that indicates a number of bits corresponding to a CQI index or value. For example, the network node 402 may transmit, and the UE 404 may receive, a control message that includes the quantization indication. The control message may include an RRC message that includes the quantization indication and/or a downlink control information (DCI) transmission that includes the quantization indication. The quantization indication may indicate a number of bits to be used to represent the one or more CQI values corresponding to one or more subbands to be reported in the CQI report. A CQI value may include a calculated value of CQI and/or a differential CQI value. In some aspects, the UE 404 may determine the number of bits to be used to represent each of the one or more CQI values based at least in part on a number of the one or more subbands to be reported in the CQI report (e.g., the number of the one or more subbands associated with a received signal). The UE 404 may obtain and/or be configured with a quantization table corresponding to each number of bits to be used. For example, the UE 404 may refer to a first table for a two-bit quantization, a second table for a three-bit quantization, a third table for a four-bit quantization, and so on.

As shown by reference number 410, for example, the network node 402 may transmit, and the UE 404 may receive, a signal associated with a communication channel. The signal may be received (and transmitted) using any number of subbands. As shown by reference number 412, the UE 404 may perform a comparison between the number of the one or more subbands and the at least one subband threshold. As shown by reference number 414, the UE 404 may determine the number of bits based at least in part on a result of the comparison. For example, in some aspects, the UE 404 may determine that the number of the one or more subbands satisfies the at least one subband threshold or that the number of the one or more subbands fails to satisfy the at least one subband threshold.

In some aspects, for example, the UE 404 may determine that the number of the one or more subbands satisfies a subband threshold and, based at least in part on that determination, may select a three-bit CQI report (i.e, a CQI report that reports one or more differential CQI values as a three-bit number). The UE 404 may determine that the number of the one or more subbands fails to satisfy the at least one subband threshold and, based at least in part on that determination, may select a two-bit CQI report.

In some aspects, more than one subband threshold may be used. According to some aspects, a CQI index or value of the one or more CQI indexes or values corresponding to the one or more subbands may be represented using a number of bits corresponding to the CQI index or value. The number of bits may be based at least in part on a number of the one or more subbands to be reported in the CQI report. In some aspects, for example, the number of bits corresponding to a CQI index or value may be a first number of bits based at least in part on a determination that the number of subbands comprises a first number of subbands or the number of bits corresponding to the CQI index or value may be a second number of bits based at least in part on a determination that the number of subbands comprises a second number of subbands. In some aspects, the first number of bits may be greater than the second number of bits and the first number of subbands may be less than the second number of subbands.

For example, as shown by reference number 416, the UE 404 may select a first quantization (Q1) if the number of subbands associated with the signal is less than (or less than or equal to) a first threshold (Th1). Q1 may be a quantization in which a first number of bits is used. The UE 404 may select a second quantization (Q2) in which a second number of bits is used if the number of subbands is greater than (or greater than or equal to) Th1 and less than (or less than or equal to) a second threshold (Th2). Q2 may be a quantization in which a second number of bits is used. In some aspects, for example, the second number of bits may be fewer than the first number of bits. The UE 404 may select a third quantization (Q3) in which a third number of bits is used if the number of subbands is greater than (or greater than or equal to) Th2 and less than (or less than or equal to) a third threshold (Th3). In some aspects, for example, the third number of bits may be fewer than the second number of bits. The UE 404 may select a fourth quantization (Q4) in which a fourth number of bits is used if the number of subbands is greater than (or greater than or equal to) Th3. In some aspects, for example, the fourth number of bits may be fewer than the third number of bits. Any number of thresholds and/or quantization options (e.g., options for the number of bits to be used in a quantization) may be implemented.

As shown by reference number 418, the UE 404 may transmit, and the network node 402 may receive, a CQI report 420. The UE 404 may transmit the CQI report based at least in part on the quantization indication. The UE 404 may transmit the CQI report based at least in part on the quantization indication by transmitting a CQI report in which the CQI values in the CQI report are represented using the number of bits indicated by the quantization indication. In some aspects, the UE 404 may transmit the CQI report based at least in part on the determined number of bits. The CQI report 420 may include one or more CQI indexes or values, for example, differential CQI values. For example, the CQI report 420 may include a first CQI index or value 422 for a first subband, a second CQI index or value 424 for a second subband, a third CQI index or value 426 for a third subband, and a fourth CQI index or value 428 for a fourth subband.

As indicated above, FIG. 4 is provided as an example. Other examples may differ from what is described with respect to FIG. 4.

Figure 5:
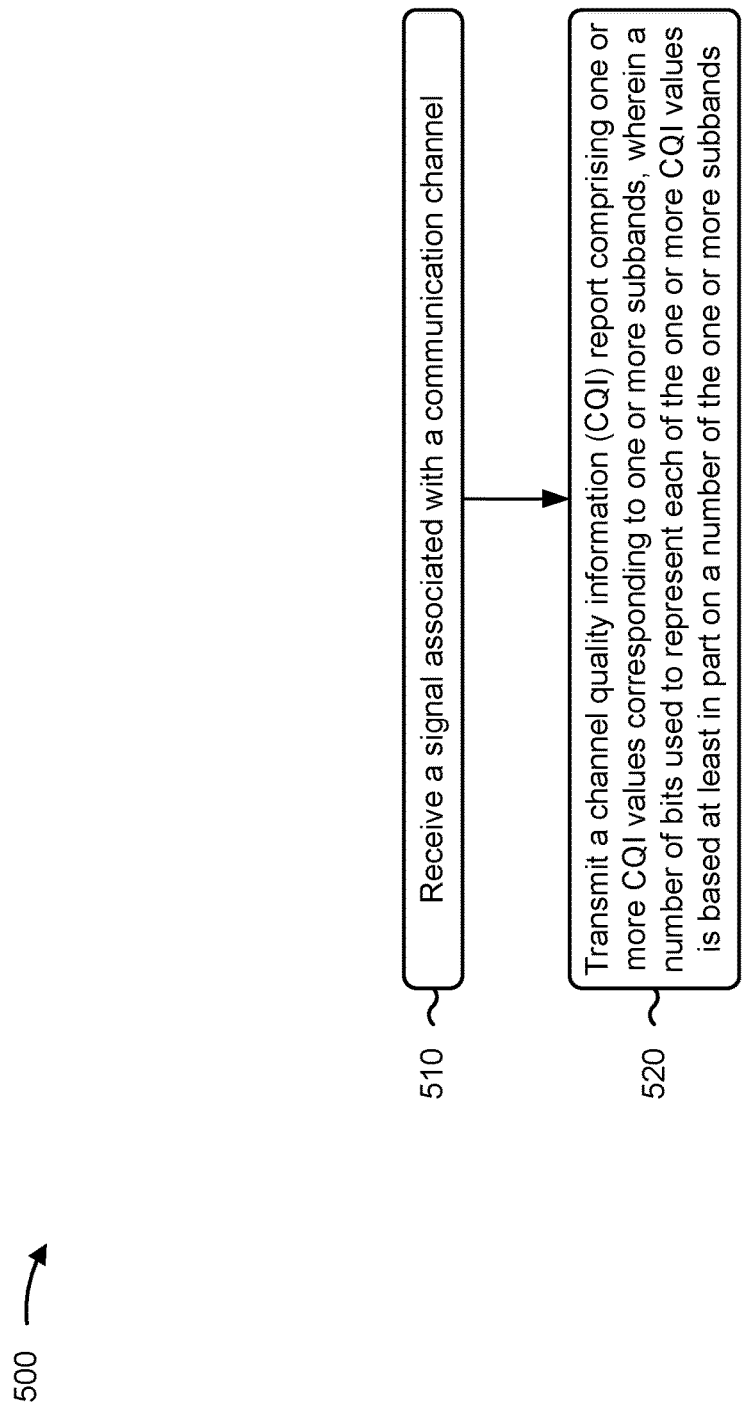
FIGS. 5 and 6 are diagrams illustrating example processes associated with dynamic quantization of channel quality information, in accordance with the present disclosure.

FIG. 5 is a diagram illustrating an example process 500 performed, for example, by a UE, in accordance with the present disclosure. Example process 500 is an example where the UE (e.g., UE 404) performs operations associated with dynamic quantization of CQI.

As shown in FIG. 5, in some aspects, process 500 may include receiving a signal associated with a communication channel (block 510). For example, the UE (e.g., using communication manager 140 and/or reception component 702, depicted in FIG. 7) may receive a signal associated with a communication channel, as described above, for example, with reference to FIG. 4.

As further shown in FIG. 5, in some aspects, process 500 may include transmitting a CQI report comprising the one or more CQI values corresponding to one or more subbands, wherein a number of bits used to represent each of the one or more CQI values is based at least in part on a number of the one or more subbands (block 520). For example, the UE (e.g., using communication manager 140 and/or transmission component 704, depicted in FIG. 7) may transmit the CQI report comprising the one or more CQI values, wherein a number of bits used to represent each of the one or more CQI values is based at least in part on a number of the one or more subbands, as described above, for example, with reference to FIG. 4.

Process 500 may include additional aspects, such as any single aspect or any combination of aspects described below and/or in connection with one or more other processes described elsewhere herein.

In a first aspect, the number of bits used to represent each of the one or more CQI values is a first number of bits based at least in part on a determination that the number of subbands comprises a first number of subbands or the number of bits used to represent each of the one or more CQI values is a second number of bits based at least in part on a determination that the number of subbands comprises a second number of subbands, wherein the first number of bits is greater than the second number of bits, and wherein the first number of subbands is less than the second number of subbands.

In a second aspect, alone or in combination with the first aspect, process 500 includes receiving a quantization indication that indicates the number of bits used to represent the one or more CQI values.

In a third aspect, alone or in combination with the second aspect, receiving the quantization indication comprises receiving a control message that includes the quantization indication.

In a fourth aspect, alone or in combination with one or more of the second through third aspects, receiving the quantization indication comprises receiving an RRC message that includes the quantization indication or a DCI transmission that includes the quantization indication.

In a fifth aspect, alone or in combination with one or more of the first through fourth aspects, process 500 includes performing a comparison between the number of the one or more subbands and at least one subband threshold, and determining the number of bits based at least in part on a result of the comparison.

In a sixth aspect, alone or in combination with the fifth aspect, performing the comparison comprises determining that the number of the one or more subbands satisfies the at least one subband threshold, and determining the number of bits comprises selecting three bits to represent the one or more CQI values.

In a seventh aspect, alone or in combination with the fifth aspect, performing the comparison comprises determining that the number of the one or more subbands fails to satisfy the at least one subband threshold, and determining the number of bits comprises selecting two bits to represent the one or more CQI values.

In an eighth aspect, alone or in combination with one or more of the fifth through seventh aspects, process 500 includes obtaining the at least one subband threshold.

In a ninth aspect, alone or in combination with the eighth aspect, obtaining the at least one subband threshold comprises obtaining the at least one subband threshold from a wireless communication standard.

In a tenth aspect, alone or in combination with one or more of the eighth through ninth aspects, obtaining the at least one subband threshold comprises receiving an indication of the at least one subband threshold.

In an eleventh aspect, alone or in combination with the tenth aspect, receiving the indication of the at least one subband threshold comprises receiving an RRC message that includes the indication of the at least one subband threshold.

In a twelfth aspect, alone or in combination with one or more of the first through eleventh aspects, each of the one or more CQI values is a differential CQI value representing a difference between a CQI index corresponding to the subband of the one or more subbands and a CQI index corresponding to a wideband CQI.

In a thirteenth aspect, alone or in combination with the twelfth aspect, each of the one or more differential CQI values corresponds to a quantized CQI offset value.

In a fourteenth aspect, alone or in combination with one or more of the first through thirteenth aspects, each of the one or more CQI values is a CQI index.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
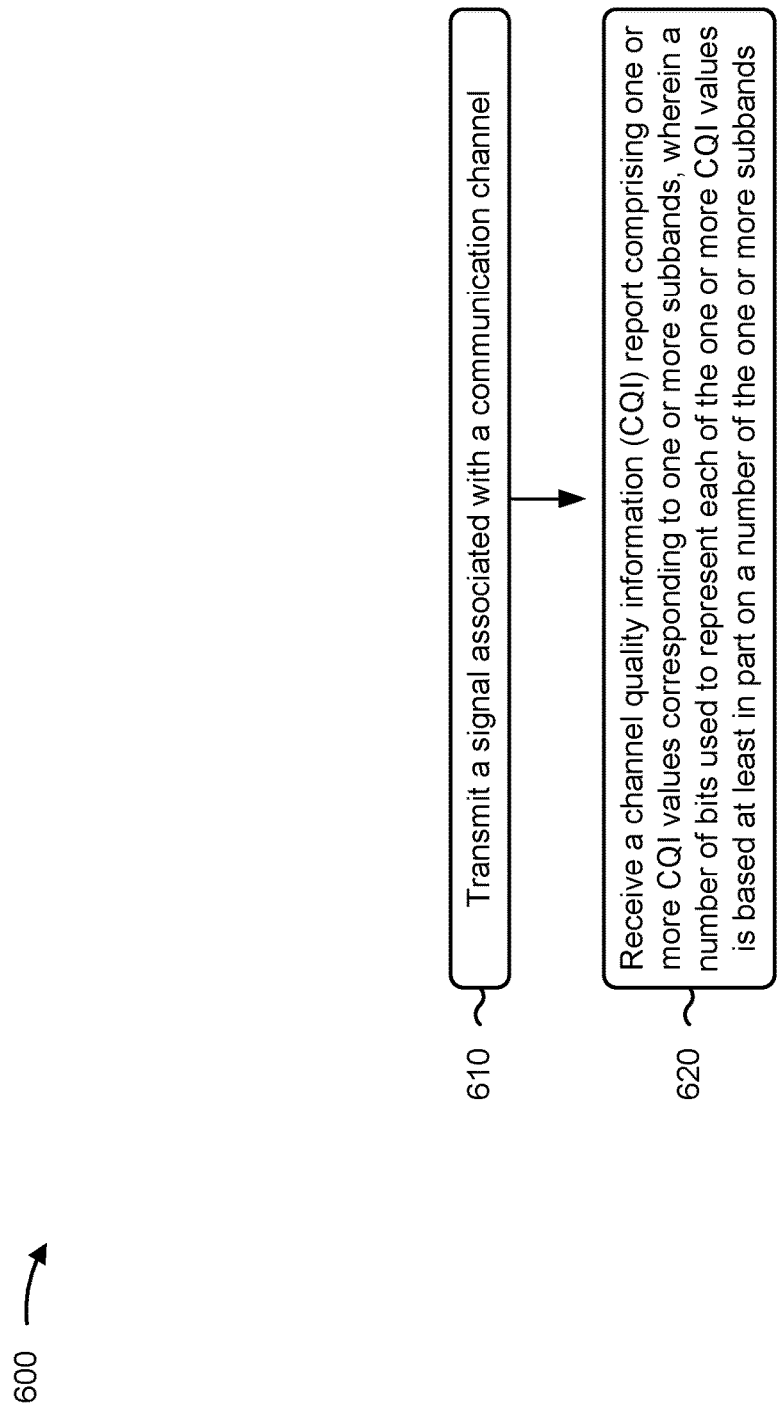

FIG. 6 is a diagram illustrating an example process 600 performed, for example, by a network node, in accordance with the present disclosure. Example process 600 is an example where the network node (e.g., network node 402) performs operations associated with dynamic quantization of CQI.

As shown in FIG. 6, in some aspects, process 600 may include transmitting a signal associated with a communication channel (block 610). For example, the network node (e.g., using communication manager 150 and/or transmission component 804, depicted in FIG. 8) may transmit a signal associated with a communication channel, as described above, for example, with reference to FIG. 4.

As further shown in FIG. 6, in some aspects, process 600 may include receiving a CQI report comprising one or more CQI values corresponding to one or more subbands, wherein a number of bits used to represent each of the one or more CQI values is based at least in part on a number of the one or more subbands (block 620). For example, the network node (e.g., using communication manager 150 and/or reception component 802, depicted in FIG. 8) may receive a CQI report comprising one or more CQI values corresponding to one or more subbands, wherein a number of bits used to represent each of the one or more CQI values is based at least in part on a number of the one or more subbands, as described above, for example, with reference to FIG. 4.

Process 600 may include additional aspects, such as any single aspect or any combination of aspects described below and/or in connection with one or more other processes described elsewhere herein.

In a first aspect, the number of bits used to represent each of the one or more CQI values is a first number of bits based at least in part on a determination that the number of the one or more subbands comprises a first number of subbands or the number of bits used to represent each of the one or more CQI values is a second number of bits based at least in part on a determination that the number of the one or more subbands comprises a second number of subbands, wherein the first number of bits is greater than the second number of bits, and wherein the first number of subbands is less than the second number of subbands.

In a second aspect, alone or in combination with the first aspect, process 600 includes transmitting a quantization indication that indicates the number of bits used to represent the one or more CQI values.

In a third aspect, alone or in combination with the second aspect, transmitting the quantization indication comprises transmitting a control message that includes the quantization indication.

In a fourth aspect, alone or in combination with one or more of the second through third aspects, transmitting the quantization indication comprises transmitting an RRC message that includes the quantization indication or a DCI transmission that includes the quantization indication.

In a fifth aspect, alone or in combination with one or more of the first through fourth aspects, process 600 includes performing a comparison between the number of the one or more subbands and at least one subband threshold, and determining the number of bits based at least in part on a result of the comparison.

In a sixth aspect, alone or in combination with the fifth aspect, performing the comparison comprises determining that the number of the one or more subbands satisfies the at least one subband threshold, and determining the number of bits comprises selecting three bits to represent the one or more CQI values.

In a seventh aspect, alone or in combination with the fifth aspect, performing the comparison comprises determining that the number of the one or more subbands fails to satisfy the at least one subband threshold, and determining the number of bits comprises selecting two bits to represent the one or more CQI values.

In an eighth aspect, alone or in combination with one or more of the fifth through seventh aspects, process 600 includes obtaining the at least one subband threshold.

In a ninth aspect, alone or in combination with the eighth aspect, obtaining the at least one subband threshold comprises obtaining the at least one subband threshold from a wireless communication standard.

In a tenth aspect, alone or in combination with one or more of the fifth through ninth aspects, process 600 includes transmitting an indication of the at least one subband threshold.

In an eleventh aspect, alone or in combination with the tenth aspect, transmitting the indication of the at least one subband threshold comprises transmitting an RRC message that includes the indication of the at least one subband threshold.

In a twelfth aspect, alone or in combination with one or more of the first through eleventh aspects, each of the one or more CQI values is a differential CQI value representing a difference between a CQI index corresponding to a subband of the one or more subbands and a CQI index corresponding to a wideband CQI.

In a thirteenth aspect, alone or in combination with the twelfth aspect, each of the one or more differential CQI values corresponds to a quantized CQI offset value.

In a fourteenth aspect, alone or in combination with one or more of the first through thirteenth aspects, each of the one or more CQI values is a CQI index.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
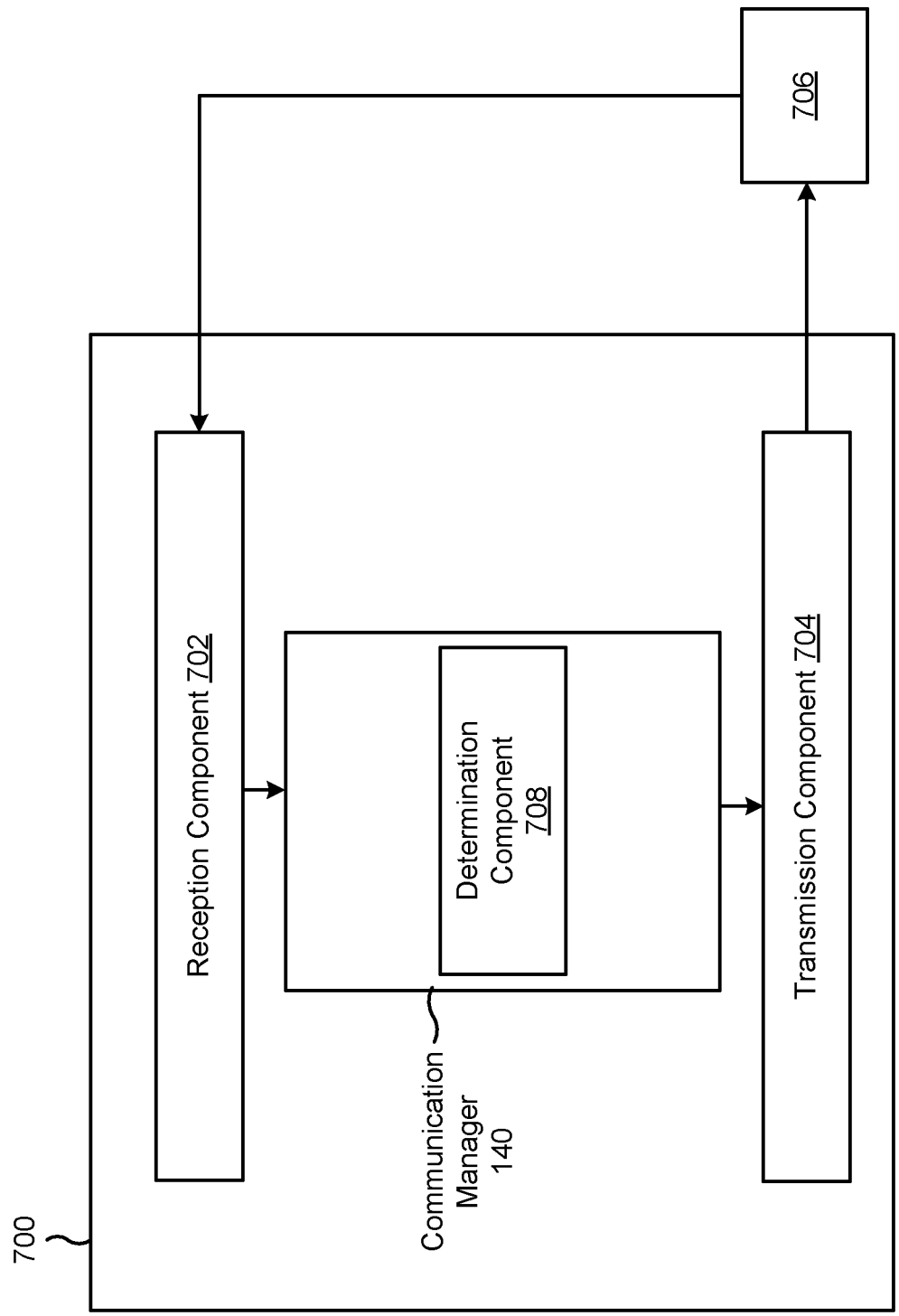
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a determination component 708.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a signal associated with a communication channel. The transmission component 704 may transmit a CQI report comprising one or more CQI values corresponding to one or more subbands, wherein a number of bits used to represent each of the one or more CQI values is based at least in part on a number of the one or more subbands.

The reception component 702 may receive a quantization indication that indicates the number of bits used to represent each of the one or more CQI values.

The communication manager 140 and/or the determination component 708 may perform a comparison between the number of the one or more subbands and at least one subband threshold. The communication manager 140 and/or the reception component 702 may obtain the at least one subband threshold. The communication manager 140 and/or the determination component 708 may determine the number of bits based at least in part on a result of the comparison. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 702 and/or the transmission component 704. In some aspects, the determination component 708 may include one or more antennas, a modem, a modulator, a transmit MIMO processor, a transmit processor, a controller/processor, a memory, or a combination thereof, of the UE described in connection with FIG. 2. In some aspects, the determination component 708 may include the reception component 702 and/or the transmission component 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
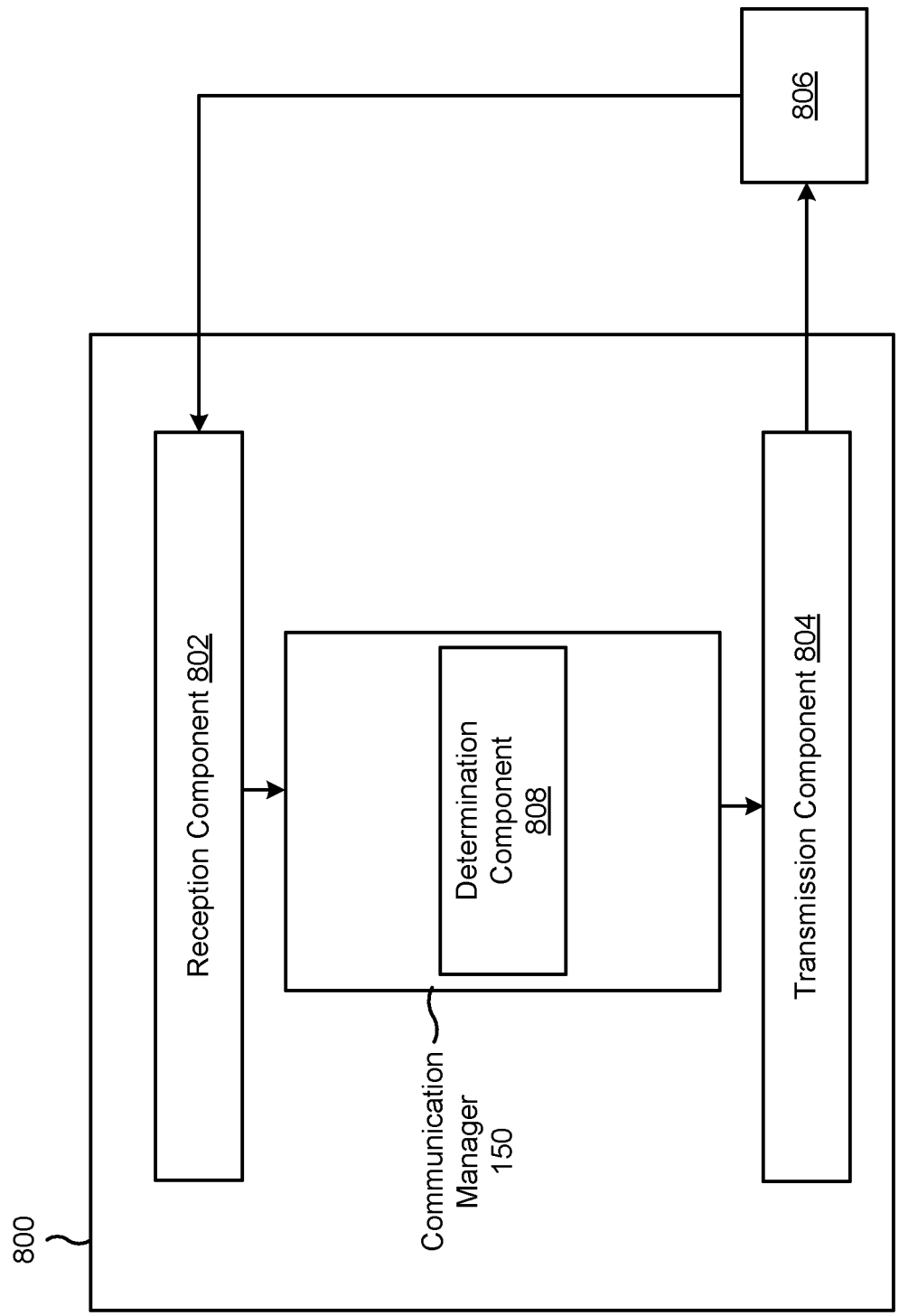

FIG. 8 is a diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include the communication manager 150. The communication manager 150 may include a determination component 808.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a signal associated with a communication channel. The reception component 802 may receive a CQI report comprising one or more CQI values corresponding to one or more subbands, wherein a number of bits used to represent each of the one or more CQI values is based at least in part on a number of the one or more subbands.

The transmission component 804 may transmit a quantization indication that indicates the number of bits corresponding to the one or more CQI values. The transmission component 804 may transmit an indication of the at least one subband threshold.

The communication manager 150 and/or the determination component 808 may perform a comparison between the number of the one or more subbands and at least one subband threshold. The communication manager 150 and/or the reception component 802 may obtain the at least one subband threshold. The determination component 808 may determine the number of bits based at least in part on a result of the comparison. In some aspects, the communication manager 150 may include one or more antennas, a modem, a modulator, a transmit MIMO processor, a transmit processor, a controller/processor, a memory, or a combination thereof, of the base station described in connection with FIG. 2. In some aspects, the communication manager 150 may include the reception component 802 and/or the transmission component 804. In some aspects, the determination component 808 may include one or more antennas, a modem, a modulator, a transmit MIMO processor, a transmit processor, a controller/processor, a memory, or a combination thereof, of the base station described in connection with FIG. 2. In some aspects, the determination component 808, may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a signal associated with a communication channel; and transmitting a channel quality indicator (CQI) report comprising one or more CQI indexes, a CQI value of the one or more CQI values corresponding to a subband of one or more subbands, wherein a number of bits used to represent the CQI value is based at least in part on a number of subbands of the one or more subbands.

Aspect 2: The method of Aspect 1, wherein the number of bits used to represent the CQI value is a first number of bits based at least in part on a determination that the number of subbands comprises a first number of subbands or the number of bits used to represent the CQI value is a second number of bits based at least in part on a determination that the number of subbands comprises a second number of subbands, wherein the first number of bits is greater than the second number of bits, and wherein the first number of subbands is less than the second number of subbands.

Aspect 3: The method of either of Aspects 1 or 2, further comprising receiving a quantization indication that indicates the number of bits used to represent the CQI value.

Aspect 4: The method of Aspect 3, wherein receiving the quantization indication comprises receiving a radio resource control (RRC) message that includes the quantization indication.

Aspect 5: The method of either of Aspects 3 or 4, wherein receiving the quantization indication comprises receiving a downlink control information (DCI) transmission that includes the quantization indication.

Aspect 6: The method of any of Aspects 1-5, further comprising: performing a comparison between the number of subbands and at least one subband threshold; and determining the number of bits based at least in part on a result of the comparison.

Aspect 7: The method of Aspect 6, wherein performing the comparison comprises determining that the number of subbands satisfies the at least one subband threshold, and wherein determining the number of bits comprises selecting three bits to represent the CQI value.

Aspect 8: The method of Aspect 6, wherein performing the comparison comprises determining that the number of subbands fails to satisfy the at least one subband threshold, and wherein determining the number of bits comprises selecting two bits to represent the CQI value.

Aspect 9: The method of any of Aspects 6-8, further comprising obtaining the at least one subband threshold.

Aspect 10: The method of Aspect 9, wherein obtaining the at least one subband threshold comprises obtaining the at least one subband threshold from a wireless communication standard.

Aspect 11: The method of either of Aspects 9 or 10, wherein obtaining the at least one subband threshold comprises receiving an indication of the at least one subband threshold.

Aspect 12: The method of Aspect 11, wherein receiving the indication of the at least one subband threshold comprises receiving a radio resource control (RRC) message that includes the indication of the at least one subband threshold.

Aspect 13: The method of any of Aspects 1-12, wherein each of the one or more CQI values is a differential CQI value representing a difference between a CQI index corresponding to the subband of the one or more subbands and a CQI index corresponding to a wideband CQI.

Aspect 14: The method of Aspect 13, wherein each of the one or more differential CQI values corresponds to a quantized CQI offset value.

Aspect 15: The method of any of Aspects 1-14, wherein each of the one or more CQI values is a CQI index.

Aspect 16: A method of wireless communication performed by a network node, comprising: transmitting a signal associated with a communication channel; and receiving a channel quality indicator (CQI) report comprising one or more CQI indexes, a CQI index of the one or more CQI indexes corresponding to a subband of one or more subbands, wherein a number of bits corresponding to the CQI index is based at least in part on a number of subbands of the one or more subbands.

Aspect 17: The method of Aspect 16, wherein the number of bits corresponding to the CQI index is a first number of bits based at least in part on a determination that the number of subbands comprises a first number of subbands or the number of bits corresponding to the CQI index is a second number of bits based at least in part on a determination that the number of subbands comprises a second number of subbands, wherein the first number of bits is greater than the second number of bits, and wherein the first number of subbands is less than the second number of subbands.

Aspect 18: The method of either of Aspects 16 or 17, further comprising transmitting a quantization indication that indicates the number of bits corresponding to the CQI index.

Aspect 19: The method of Aspect 18, wherein transmitting the quantization indication comprises transmitting a radio resource control (RRC) message that includes the quantization indication.

Aspect 20: The method of either of Aspects 18 or 19, wherein transmitting the quantization indication comprises transmitting a downlink control information (DCI) transmission that includes the quantization indication.

Aspect 21: The method of any of Aspects 16-20, further comprising: performing a comparison between the number of subbands and at least one subband threshold; and determining the number of bits based at least in part on a result of the comparison.

Aspect 22: The method of Aspect 21, wherein performing the comparison comprises determining that the number of subbands satisfies the at least one subband threshold, and wherein determining the number of bits comprises selecting a three-bit CQI report.

Aspect 23: The method of Aspect 21, wherein performing the comparison comprises determining that the number of subbands fails to satisfy the at least one subband threshold, and wherein determining the number of bits comprises selecting a two-bit CQI report.

Aspect 24: The method of any of Aspects 21-23, further comprising obtaining the at least one subband threshold.

Aspect 25: The method of Aspect 24, wherein obtaining the at least one subband threshold comprises obtaining the at least one subband threshold from a wireless communication standard.

Aspect 26: The method of any of Aspects 21-25, further comprising transmitting an indication of the at least one subband threshold.

Aspect 27: The method of Aspect 26, wherein transmitting the indication of the at least one subband threshold comprises transmitting a radio resource control (RRC) message that includes the indication of the at least one subband threshold.

Aspect 28: An apparatus for wireless communication at a device, comprising a processor; memory coupled with the processor; and instructions stored in the memory and executable by the processor to cause the apparatus to perform the method of one or more of Aspects 1-15.

Aspect 29: A device for wireless communication, comprising a memory and one or more processors coupled to the memory, the one or more processors configured to perform the method of one or more of Aspects 1-15.

Aspect 30: An apparatus for wireless communication, comprising at least one means for performing the method of one or more of Aspects 1-15.

Aspect 31: A non-transitory computer-readable medium storing code for wireless communication, the code comprising instructions executable by a processor to perform the method of one or more of Aspects 1-15.

Aspect 32: A non-transitory computer-readable medium storing a set of instructions for wireless communication, the set of instructions comprising one or more instructions that, when executed by one or more processors of a device, cause the device to perform the method of one or more of Aspects 1-15.

Aspect 33: An apparatus for wireless communication at a device, comprising a processor; memory coupled with the processor; and instructions stored in the memory and executable by the processor to cause the apparatus to perform the method of one or more of Aspects 16-27.

Aspect 34: A device for wireless communication, comprising a memory and one or more processors coupled to the memory, the one or more processors configured to perform the method of one or more of Aspects 16-27.

Aspect 35: An apparatus for wireless communication, comprising at least one means for performing the method of one or more of Aspects 16-27.

Aspect 36: A non-transitory computer-readable medium storing code for wireless communication, the code comprising instructions executable by a processor to perform the method of one or more of Aspects 16-27.

Aspect 37: A non-transitory computer-readable medium storing a set of instructions for wireless communication, the set of instructions comprising one or more instructions that, when executed by one or more processors of a device, cause the device to perform the method of one or more of Aspects 16-27.

Aspect 38: A method of wireless communication performed by a user equipment (UE), comprising: receiving a control message that includes a quantization indication that indicates a number of bits used to represent one or more channel quality indicator (CQI) values corresponding to one or more subbands to be reported in a CQI report, wherein the number of bits used to represent each of the one or more CQI values is based at least in part on a number of the one or more subbands to be reported in the CQI report; receiving a signal associated with a communication channel; and transmitting the CQI report comprising the one or more CQI values based at least in part on the quantization indication.

Aspect 39: The method of Aspect 38, wherein the number of bits used to represent the one or more CQI values is a first number of bits based at least in part on a determination that the number of subbands to be reported in the CQI report comprises a first number of subbands or the number of bits used to represent the one or more CQI values is a second number of bits based at least in part on a determination that the number of subbands to be reported in the CQI report comprises a second number of subbands, wherein the first number of bits is greater than the second number of bits, and wherein the first number of subbands is less than the second number of subbands.

Aspect 40: The method of either of Aspects 38 or 39, wherein each of the one or more CQI values is a differential CQI value representing a difference between a CQI index corresponding to a subband associated with each CQI and a CQI index corresponding to a wideband CQI.

Aspect 41: The method of Aspect 40, wherein each of the one or more differential CQI values corresponds to a quantized CQI offset value.

Aspect 42: The method of any of Aspect 38-41, wherein each of the one or more CQI values is a CQI index.

Aspect 43: The method of any of Aspects 38-42, wherein the control message comprises a radio resource control message or a downlink control information transmission.

Aspect 44: A method of wireless communication performed by a user equipment (UE), comprising: receiving a signal associated with a communication channel; determining a number of bits used to represent one or more channel quality indicator (CQI) values corresponding to one or more subbands to be reported in a CQI report, wherein the number of bits used to represent each of the one or more CQI values is based at least in part on a number of the one or more subbands to be reported in the CQI report; and transmitting the CQI report comprising the one or more CQI values based at least in part on the determined number of bits.

Aspect 45: The method of Aspect 44, further comprising: performing a comparison between the number of the one or more subbands and at least one subband threshold, wherein determining the number of bits comprises determining the number of bits based at least in part on a result of the comparison.

Aspect 46: The method of Aspect 45, wherein performing the comparison comprises determining that the number of the one or more subbands satisfies the at least one subband threshold, and wherein determining the number of bits comprises selecting three bits to represent the one or more CQI values.

Aspect 47: The method of Aspect 45, wherein performing the comparison comprises determining that the number of the one or more subbands fails to satisfy the at least one subband threshold, and wherein determining the number of bits comprises selecting two bits to represent the one or more CQI values.

Aspect 48: The method of any of Aspects 44-47, further comprising obtaining the at least one subband threshold.

Aspect 49: The method of Aspect 48, wherein the at least one subband threshold is based at least in part on a wireless communication standard.

Aspect 50: The method of either of Aspects 48 or 49, wherein obtaining the at least one subband threshold comprises receiving an indication of the at least one subband threshold.

Aspect 51: The method of Aspect 50, wherein receiving the indication of the at least one subband threshold comprises receiving a radio resource control (RRC) message that includes the indication of the at least one subband threshold.

Aspect 52: An apparatus for wireless communication at a device, comprising a processor; memory coupled with the processor; and instructions stored in the memory and executable by the processor to cause the apparatus to perform the method of one or more of Aspects 38-43.

Aspect 53: A device for wireless communication, comprising a memory and one or more processors coupled to the memory, the one or more processors configured to perform the method of one or more of Aspects 38-43.

Aspect 54: An apparatus for wireless communication, comprising at least one means for performing the method of one or more of Aspects 38-43.

Aspect 55: A non-transitory computer-readable medium storing code for wireless communication, the code comprising instructions executable by a processor to perform the method of one or more of Aspects 38-43.

Aspect 56: A non-transitory computer-readable medium storing a set of instructions for wireless communication, the set of instructions comprising one or more instructions that, when executed by one or more processors of a device, cause the device to perform the method of one or more of Aspects 38-43.

Aspect 57: An apparatus for wireless communication at a device, comprising a processor; memory coupled with the processor; and instructions stored in the memory and executable by the processor to cause the apparatus to perform the method of one or more of Aspects 44-51.

Aspect 58: A device for wireless communication, comprising a memory and one or more processors coupled to the memory, the one or more processors configured to perform the method of one or more of Aspects 44-51.

Aspect 59: An apparatus for wireless communication, comprising at least one means for performing the method of one or more of Aspects 44-51.

Aspect 60: A non-transitory computer-readable medium storing code for wireless communication, the code comprising instructions executable by a processor to perform the method of one or more of Aspects 44-51.

Aspect 61: A non-transitory computer-readable medium storing a set of instructions for wireless communication, the set of instructions comprising one or more instructions that, when executed by one or more processors of a device, cause the device to perform the method of one or more of Aspects 44-51.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving an indication of a subband threshold;
   determining a quantity of bits used to represent one or more channel quality indicator (CQI) values, corresponding to one or more subbands to be reported in a CQI report,
   wherein the quantity of bits used to represent the one or more CQI values is based at least in part on a quantity of the one or more subbands in comparison to the subband threshold, and
   wherein:
      a first quantity of bits, used to represent the one or more CQI values, corresponds to the quantity of the one or more subbands failing to satisfy the subband threshold, and
      a second quantity of bits, used to represent the one or more CQI values, corresponds to the quantity of the one or more subbands satisfying the subband threshold; and
   transmitting the CQI report comprising the one or more CQI values based at least in part on the determined quantity of bits.

2. The method of claim 1, wherein the first quantity of bits is greater than the second quantity of bits, and wherein the first quantity of subbands is less than the second quantity of subbands.

3. The method of claim 1, wherein the one or more CQI values are differential CQI values, representing a difference between a CQI index corresponding to a subband associated with each CQI and a CQI index corresponding to a wideband CQI.

4. The method of claim 3, wherein the one or more differential CQI values correspond to quantized CQI offset values.

5. The method of claim 1, wherein the one or more CQI values are CQI indexes.

6. The method of claim 1, wherein the indication of the subband threshold is carried in a radio resource control message.

7. The method of claim 1, wherein transmitting the CQI report comprising the one or more CQI values is based at least in part on a quantization table corresponding to the determined quantity of bits, and
   wherein the UE is configured with a quantization table corresponding to a quantization level associated with representing the one or more CQI values.

8. The method of claim 1, wherein the indication of the subband threshold comprises an indication of multiple subband thresholds including the subband threshold, and
wherein the UE uses the multiple subband thresholds to determine the quantity of bits.

9. The method of claim 8, wherein:
the UE selects the first quantity of bits when the quantity of the one or more subbands fails to satisfy the subband threshold, the subband threshold being a first subband threshold of the multiple subband thresholds,
the UE selects the second quantity of bits when the quantity of the one or more subbands satisfies the subband threshold and fails to satisfy a second subband threshold of the multiple subband thresholds, and
the UE selects a third quantity of bits when the quantity of the one or more subbands satisfies the second subband threshold and fails to satisfy a third subband threshold of the multiple subband thresholds.

10. The method of claim 9, wherein the UE selects a fourth quantity of bits when the quantity of the one or more subbands satisfies the third subband threshold.

11. A method of wireless communication performed by a user equipment (UE), comprising:
determining a quantity of bits used to represent one or more channel quality indicator (CQI) values, corresponding to one or more subbands to be reported in a CQI report,
wherein the quantity of bits used to represent the one or more CQI values is based at least in part on a comparison between a quantity of the one or more subbands and a threshold, and
wherein:
a first quantity of bits, used to represent the one or more CQI values, corresponds to the quantity of the one or more subbands failing to satisfy the threshold, and
a second quantity of bits, used to represent the one or more CQI values, corresponds to the quantity of the one or more subbands satisfying the threshold; and
transmitting the CQI report comprising the one or more CQI values based at least in part on the determined quantity of bits.

12. The method of claim 11, wherein the comparison comprises determining that the quantity of the one or more subbands satisfies the threshold, and wherein determining the quantity of bits comprises selecting three bits to represent the one or more CQI values.

13. The method of claim 11, wherein the comparison comprises determining that the quantity of the one or more subbands fails to satisfy the threshold, and wherein determining the quantity of bits comprises selecting two bits to represent the one or more CQI values.

14. The method of claim 11, further comprising obtaining the threshold.

15. The method of claim 14, wherein the threshold is obtained from a wireless communication standard.

16. The method of claim 14, wherein obtaining the threshold comprises receiving an indication of the threshold.

17. The method of claim 16, wherein receiving the indication of the threshold comprises receiving a radio resource control (RRC) message that includes the indication of the threshold.

18. The method of claim 11, wherein transmitting the CQI report comprising the one or more CQI values is based at least in part on a quantization table corresponding to the determined quantity of bits, and wherein the UE is configured with a quantization table corresponding to a quantization level associated with representing the one or more CQI values.

19. A user equipment (UE) for wireless communication, comprising:
a memory; and
one or more processors, coupled to the memory, configured to:
receive an indication of a subband threshold;
determining a quantity of bits used to represent one or more channel quality indicator (CQI) values, corresponding to one or more subbands to be reported in a CQI report,
wherein the quantity of bits used to represent the one or more CQI values is based at least in part on a quantity of the one or more subbands in comparison to the subband threshold, and
wherein:
a first quantity of bits, used to represent the one or more CQI values, corresponds to the quantity of the one or more subbands failing to satisfy the subband threshold, and
a second quantity of bits, used to represent the one or more CQI values, corresponds to the quantity of the one or more subbands satisfying the subband threshold; and
transmit the CQI report comprising the one or more CQI values based at least in part on the determined quantity of bits.

20. The UE of claim 19, wherein the first quantity of bits is greater than the second quantity of bits, and wherein the first quantity of subbands is less than the second quantity of subbands.

21. The UE of claim 19, wherein the one or more CQI values are differential CQI values, representing a difference between a CQI index corresponding to a subband associated with each CQI and a CQI index corresponding to a wideband CQI.

22. The UE of claim 21, wherein the one or more differential CQI values correspond to quantized CQI offset values.

23. The UE of claim 19, wherein the one or more CQI values are CQI indexes.

24. A user equipment (UE) for wireless communication, comprising:
a memory; and
one or more processors, coupled to the memory, configured to:
determine a quantity of bits used to represent one or more channel quality indicator (CQI) values, corresponding to one or more subbands to be reported in a CQI report,
wherein the quantity of bits used to represent the one or more CQI values is based at least in part on a comparison between a quantity of the one or more subbands and a threshold, and
wherein:
a first quantity of bits, used to represent the one or more CQI values, corresponds to the quantity of the one or more subbands failing to satisfy the threshold, and
a second quantity of bits, used to represent the one or more CQI values, corresponds to the quantity of the one or more subbands satisfying the threshold; and transmit the CQI report comprising the one or more CQI values based at least in part on the determined quantity of bits.

25. The UE of claim 24, wherein the one or more processors, to perform the comparison, are configured to determine that the quantity of the one or more subbands satisfies the threshold, and wherein the one or more processors, to determine the quantity of bits, are configured to select three bits to represent the one or more CQI values.

26. The UE of claim 24, wherein the one or more processors, to perform the comparison, are configured to determine that the quantity of the one or more subbands fails to satisfy the threshold, and wherein the one or more processors, to determine the quantity of bits, are configured to select two bits to represent the one or more CQI values.

27. The UE of claim 24, wherein the one or more processors are further configured to obtain the threshold.

28. The UE of claim 27, wherein the one or more processors, to obtain the threshold, are configured to obtain the threshold from a wireless communication standard.

29. The UE of claim 27, wherein the one or more processors, to obtain the threshold, are configured to receive an indication of the threshold.

30. The UE of claim 29, wherein the one or more processors, to receive the indication of the threshold, are configured to receive a radio resource control (RRC) message that includes the indication of the threshold.

* * * * *